US010164227B2

(12) United States Patent
Hofer

(10) Patent No.: US 10,164,227 B2
(45) Date of Patent: Dec. 25, 2018

(54) DEGASSING VALVE

(71) Applicant: Lisa Draexlmaier GmbH, Vilsbiburg (DE)

(72) Inventor: Guido Hofer, Weng (DE)

(73) Assignee: Lisa Draexlmaier GMBH, Vilsbiburg (DE)

( * ) Notice: Subject to any disclaimer, the term of this patent is extended or adjusted under 35 U.S.C. 154(b) by 622 days.

(21) Appl. No.: 14/816,677

(22) Filed: Aug. 3, 2015

(65) Prior Publication Data

US 2016/0036025 A1 Feb. 4, 2016

(30) Foreign Application Priority Data

Aug. 4, 2014 (DE) .......................... 10 2014 111 041

(51) Int. Cl.
*H01M 2/12* (2006.01)
(52) U.S. Cl.
CPC ....... *H01M 2/1241* (2013.01); *H01M 2/1205* (2013.01); *H01M 2/1229* (2013.01); *H01M 2/1235* (2013.01); *H01M 2/1276* (2013.01); *H01M 2/1288* (2013.01); *H01M 2220/20* (2013.01)
(58) Field of Classification Search
CPC ........... H01M 2220/20; H01M 2/1205; H01M 2/1229; H01M 2/1235; H01M 2/1276; H01M 2/1288; B65D 25/20; F16K 7/00; F16K 7/12
See application file for complete search history.

(56) References Cited

U.S. PATENT DOCUMENTS

| 6,521,024 B1 * | 2/2003 | Akahori .............. H01M 2/1241 96/12 |
| 2005/0039806 A1 * | 2/2005 | Nakayama .......... F16K 17/0453 137/853 |
| 2013/0098912 A1 * | 4/2013 | Scagliarini .......... H01M 2/1205 220/89.1 |

FOREIGN PATENT DOCUMENTS

DE 10 2011 109 243 A1 2/2013
DE 10 2012 022 346 A1 5/2014

* cited by examiner

*Primary Examiner* — Barbara L Gilliam
*Assistant Examiner* — Adam A Arciero
(74) *Attorney, Agent, or Firm* — Finnegan, Henderson, Farabow, Garrett & Dunner LLP

(57) ABSTRACT

A degassing valve for degassing a housing of a motor vehicle includes a support element coupled to the housing, a membrane that is water-proof and breathable, and a tensioning frame configured to press the membrane against the support element with a pressing force. The tensioning frame is configured such that when a pressure difference between an interior of the housing and a surrounding of the housing exceeds a trigger force, the membrane detaches from the support element and exposes a fluid channel between the interior of the housing and the surrounding of the housing. The exposed fluid channel is configured to degas the interior of the housing.

17 Claims, 4 Drawing Sheets

DEGASSING VALVE

CROSS-REFERENCE TO RELATED APPLICATION

This application is based upon and claims the benefit of prior German Application No. 10 2014 111 041.2, filed on Aug. 4, 2014, the entire contents of which are incorporated herein by reference.

TECHNICAL FIELD

The present disclosure relates to a degassing valve for degassing a housing, in particular a housing of a battery of a motor vehicle.

BACKGROUND OF THE DISCLOSURE

Battery housings disposed in an outside region of a motor vehicle need to be waterproof because penetrating wastewater or salt water would result in leakage currents or even short circuits and pose a fire hazard. When the batteries are used in the interior of a motor vehicle, such as in the trunk, the batteries need to be gas-tight to protect occupants from leaking, potentially toxic, gases in the event of outgassing of an energy storage cell.

On the other hand, temperature changes result in pressure fluctuations of the air volume enclosed in the battery housing, which can result in high mechanical stresses of the battery housing. Likewise, air pressure fluctuations due to changes in the weather or changes in the elevation of the motor vehicles, in particular in the mountains, generate forces that have an effect on the battery housing.

As a result, there are conflicting requirements. On the one hand, a waterproof or gas-tight design is needed. On the other hand, pressure equalization is needed.

While conventional pressure equalization elements for battery housings, such as those disclosed in EP 0 856 897 B1 and U.S. Pat. No. 6,368,741 B1, can be waterproof, they nonetheless allow a defined gas exchange. Gore-Tex membranes, as they can also be found in functional clothing, have been used for this task. These Gore-Tex membranes have the property of being water-proof but yet breathable.

In addition, it is known to provide separate rupture disks in the housing walls, which tear when the pressure in the housing rises suddenly. Such rupture disks are described in DE 10 2012 221 753 A1 and DE 10 2012 219 379 A1, for example. Rupture disks or burst diaphragms seal an opening in the housing, but are intended to rupture at a certain pressure difference between the interior of the battery housing and the surroundings of the battery and thereby enable rapid gas throughput. This can take place, for example, by the use of deliberately weakened rubber elements. However, these rubber elements do not function reliably, because the rubber cannot be reliably produced in accordingly thin layers using injection molding. Moreover, the rubber loses the elastic properties thereof during aging. On the other hand, rupture disks in the form of burst diaphragms, which have defined failure pressures as a result of a specific layer composition, are very expensive.

SUMMARY

It is an object of the present disclosure to provide a cost-effective degassing valve.

The disclosure includes a degassing valve for degassing a housing, in particular a housing of a battery of a motor vehicle. The degassing valve includes a membrane that is waterproof yet breathable. Breathable in this context may mean that the membrane allows a defined volume of gas per unit of time to pass when a certain pressure difference exists between an interior of the housing and surroundings of the housing. The degassing valve further includes a tensioning frame, which presses the membrane against a support element of the degassing valve with a predetermined pressing force. The support element includes a grating, for example. The pressing force is lower than a trigger force at which the membrane detaches from the support element and exposes a fluid channel between the interior of the housing and the surroundings of the vehicle. A force may therefore press from the interior of the housing on the membrane, which is dependent on a pressure difference between the interior and the surroundings of the housing.

When the pressure difference between the interior and the surroundings of the housing reaches and/or exceeds a predetermined threshold value, the trigger force is applied, and the membrane detaches from the support element, whereby the fluid channel between the interior and the surroundings of the housing is exposed. In contrast, in some embodiments, when the membrane is pressed onto the support element, a gas exchange between the interior of the housing and the surroundings of the housing is possible only via the membrane.

In this way, the function of a pressure relief valve, which is to say of the described rupture disk, for example, and the function of a pressure equalization element are combined in a single degassing valve. This results in cost advantages not only in production, but also in assembly due to the reduced number of parts that must be installed. Moreover, less installation space is needed, and the total weight of the battery is reduced.

In some embodiments, the tensioning frame and the membrane are disposed in such a way that the tensioning frame presses the membrane in the direction toward the interior of the housing. The described operating mode can therefore be achieved by a particularly simple geometry.

In some embodiments, the degassing valve includes at least one spring element to press the tensioning frame in the direction toward the support element. The spring element can be a coil spring, for example. In some embodiments, the at least one spring element is designed as at least one flexible spring, for example as at least one leaf spring, which is connected to the tensioning frame.

The degassing valve may include a cover, which forms a stop for the at least one spring element. In some embodiments, the tensioning spring and the membrane are disposed between the cover and the support element.

The cover can be connected to a housing body of the degassing valve in a form-locked manner. The housing body includes the support element. Such a form-locked connection can be achieved by way of a latching engagement, for example. It goes without saying that a screw assembly would also be conceivable.

In some embodiments, the membrane is clamped between the tensioning frame and the support element when the trigger force is not reached. In contrast, if the trigger force is achieved, the membrane slides out from between the tensioning frame and the support element. The trigger process is therefore irreversible in this example. After triggering, the degassing valve needs to be replaced to restore the original functionality of the same.

In some embodiments, the membrane is connected to the tensioning frame in an integral, form-locked and/or force-fit manner. This can be achieved, for example, by welding, bonding, or clamping the membrane to the tensioning frame. In some embodiments, the at least one spring element is designed in such a way that the tensioning frame lifts off from the support element together with the membrane when the trigger force is reached, i.e., when the pressure difference reaches and/or exceeds the threshold value. When the pressure difference drops below the threshold value again, i.e., when the trigger force is no longer applied, the at least one spring element again presses the tensioning frame against the support element. In this way, the trigger mechanism is reversible. Consequently, replacing the degassing valve after triggering is not required.

The membrane can be designed to be essentially circular, for example, and the tensioning frame can be designed to be essentially annular. The pressure on the membrane is therefore distributed evenly.

The membrane can be made of polytetrafluoroethylene (PTFE), for example. This material is also known by the designation TEFLON or the brand name GORE-TEX®.

The tensioning frame can be designed in such a way, for example, that a pressure difference between the interior of the housing and the surroundings of the housing, which ranges between 5 hPa and 50 hPa, in particular between 15 hPa and 25 hPa, results in the trigger force.

The disclosure additionally includes a battery for a motor vehicle including a degassing valve according to the disclosure.

BRIEF DESCRIPTION OF THE FIGURES

Further details and related advantages of embodiments of the invention will be described hereafter with reference to the figures.

FIG. 3 shows an exploded view of the degassing valve of FIG. 2a.

DESCRIPTION OF EMBODIMENTS

Figure 1:
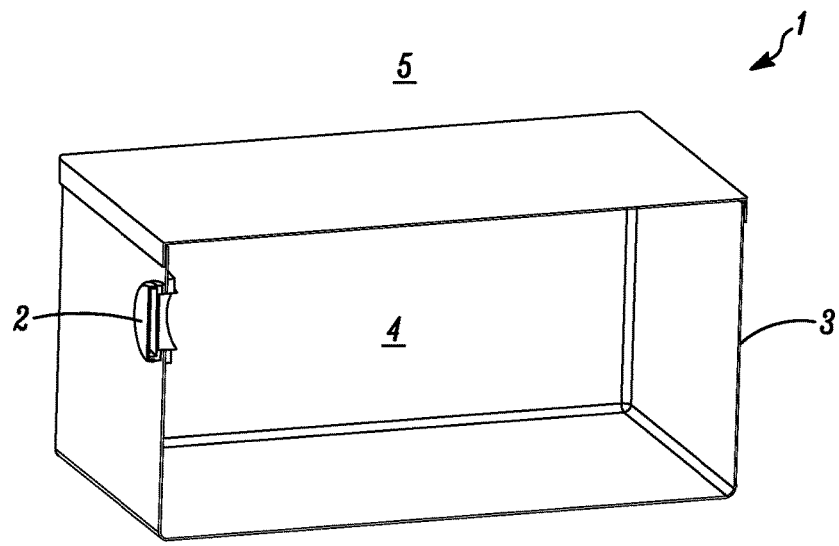
FIG. 1 shows a battery according to an exemplary embodiment.

Identical and identically acting elements are denoted by the same reference numerals in the following description, unless indicated otherwise.

FIG. 1 shows an exemplary battery 1 according to the disclosure. The battery 1 includes a degassing valve 2, which is disposed in a wall of a housing 3 of the battery 1. The housing 3 has an interior 4 and surroundings 5. For simplicity reasons, the interior of the battery 1, such as energy storage cells, for example, is not shown.

Figure 2A:
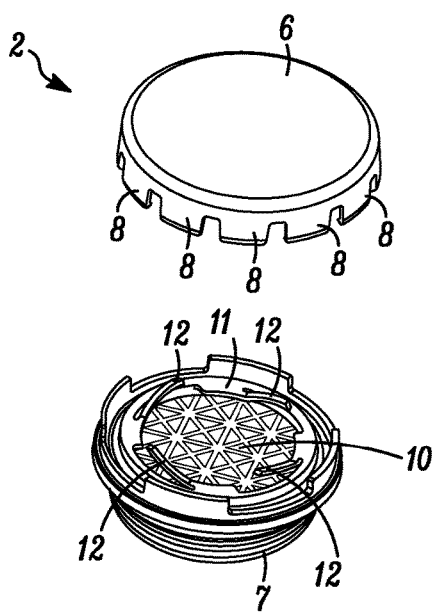
FIG. 2a shows an oblique view from above of a degassing valve according to an exemplary embodiment, with the cover removed.
Figure 2B:
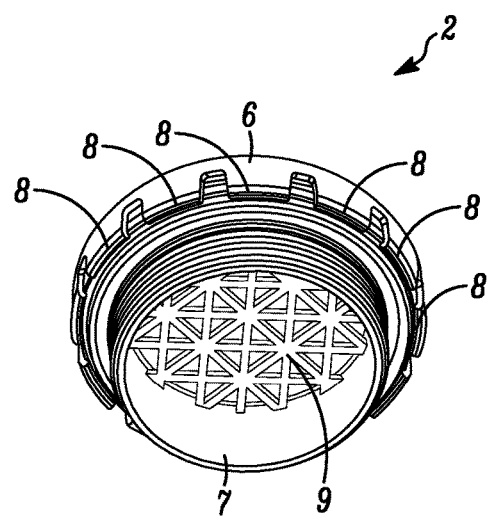
FIG. 2b shows an oblique view from beneath of the degassing valve of FIG. 2a, with a cover attached.

FIGS. 2a and 2b show an example of the degassing valve 2. FIG. 2a shows the degassing valve 2 in an oblique view from above, wherein a cover 6 is not attached to a housing body 7 of the degassing valve 2. FIG. 2b illustrates the same degassing valve 2 again in an oblique view from beneath, wherein the cover 6 is located on the housing body 7. The cover 6 is connected to the housing body 7 in a form-locked manner via multiple detent elements 8. The housing body 7 includes a support element 9 in the form of a grating, on which a membrane 10 is seated. The membrane 10 is produced from polytetrafluoroethylene, which is waterproof but yet breathable. The membrane 10 is pressed by a tensioning frame 11 against the support element 9 with a predetermined pressing force. For this purpose, the tensioning frame 11 has four flexible springs 12. The flexible springs 12 are connected in one piece to the tensioning frame 11. In the assembled state, as shown in FIG. 2b, for example, the flexible springs 12 press against the cover 6, which is connected to the housing body 7 in a form-locked manner, so that the flexible springs 12 press the tensioning spring 11 with a predetermined pressing force onto the membrane seated on the support element 9.

Figure 3:
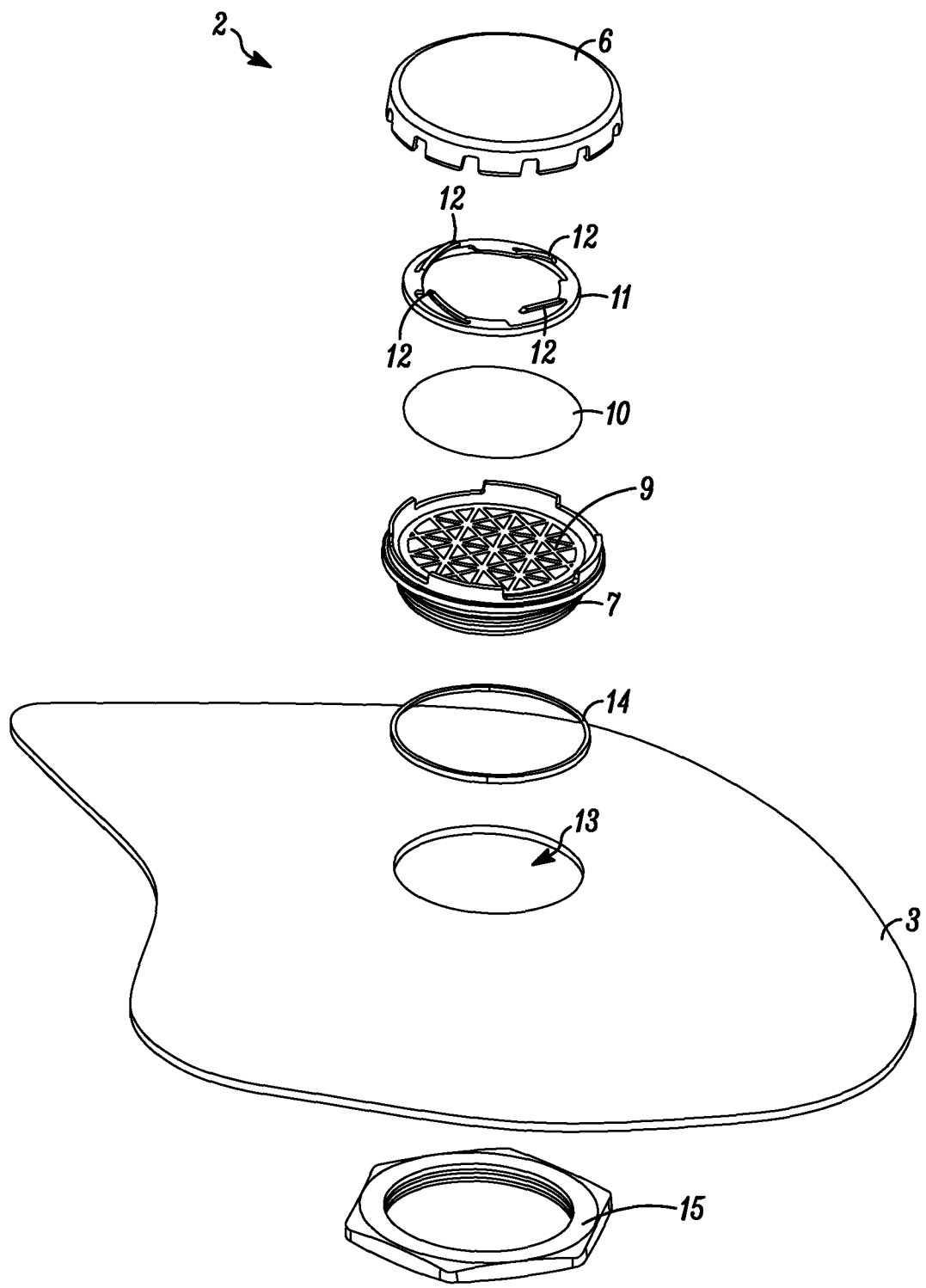

The composition of the degassing valve 2 is shown again in an exploded view in FIG. 3. The housing body 7, which includes the support element 9, is introduced into a hole 13 of the housing 3 and sealed with respect to the housing 3 by way of a sealing ring 14. With the aid of a nut 15, which is screwed onto a thread of the housing body 7, the housing body 7 is fastened in the hole 13 of the housing 3. The membrane 10 is placed onto the support element 9 of the housing body 7. With the aid of the tensioning frame 11, which includes the four flexible springs 12, the membrane 10 is pressed against the support element 9 with a predetermined pressing force. The cover 6 serves as a stop for the flexible springs 12. As seen from FIG. 3, the membrane 10 essentially has the shape of a circle, while the tensioning spring 11 has an essentially annular design.

Figure 4:
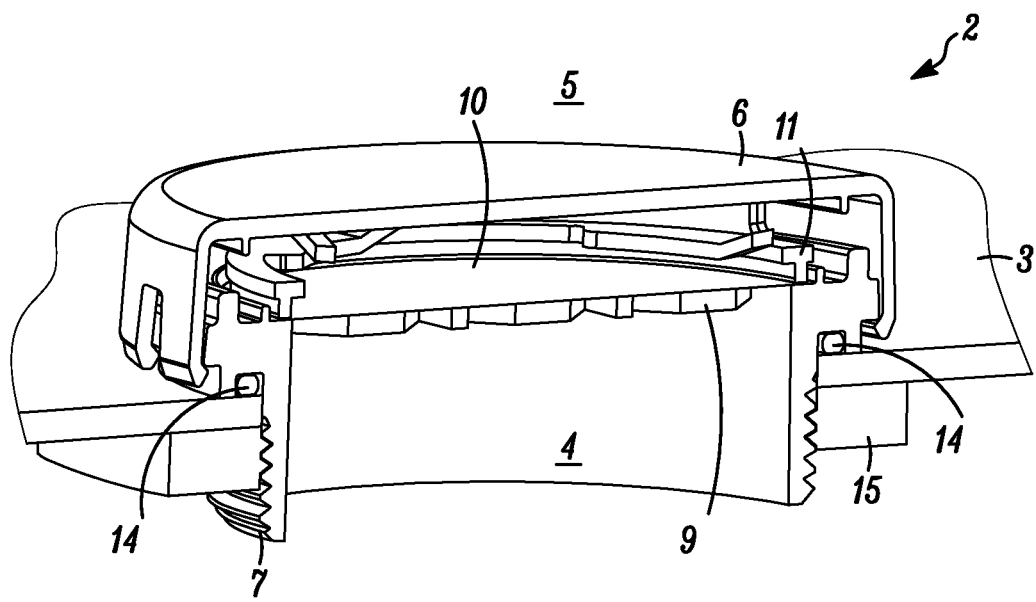
FIG. 4 shows a sectional view through the degassing valve of FIG. 2a, wherein the trigger force is not reached.

FIG. 4 shows a situation of the degassing valve 2 in which a pressure difference between the interior 4 and the surroundings 5 of the housing 3 is not sufficient to apply the trigger force. Accordingly, the membrane 10 is seated on the support element 9 and is clamped between the tensioning frame 11 and the support element 9.

Figure 5:
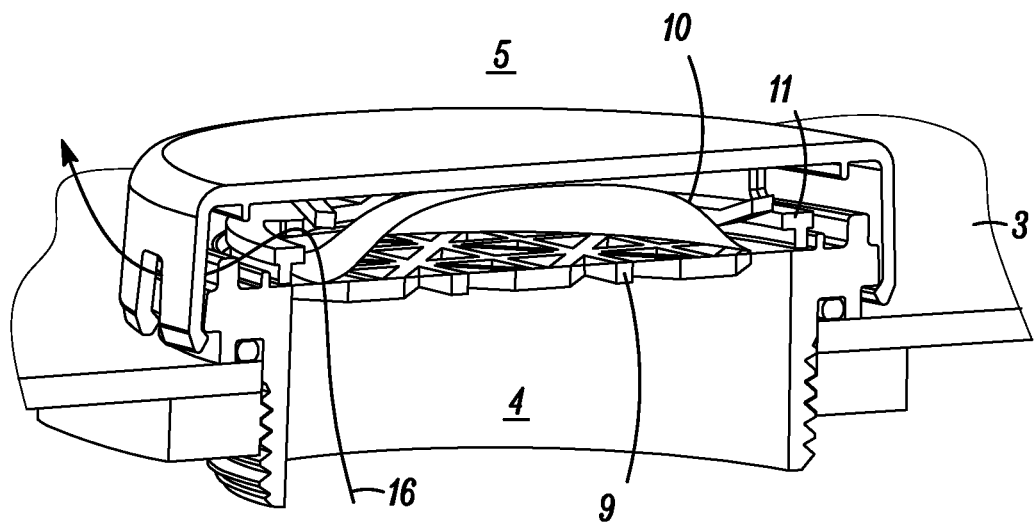
FIG. 5 shows a sectional view through the degassing valve of FIG. 4, wherein the trigger force is reached.

FIG. 5, in contrast, shows a situation in which the pressure difference between the interior 4 and the surroundings 5 of the housing 3 is so large that the trigger force is reached. The membrane 10 accordingly slides out from between the tensioning frame 11 and the support element 9, so that a fluid channel 16 between the interior 4 and the surroundings 5 of the housing 3 is exposed.

Figure 6:
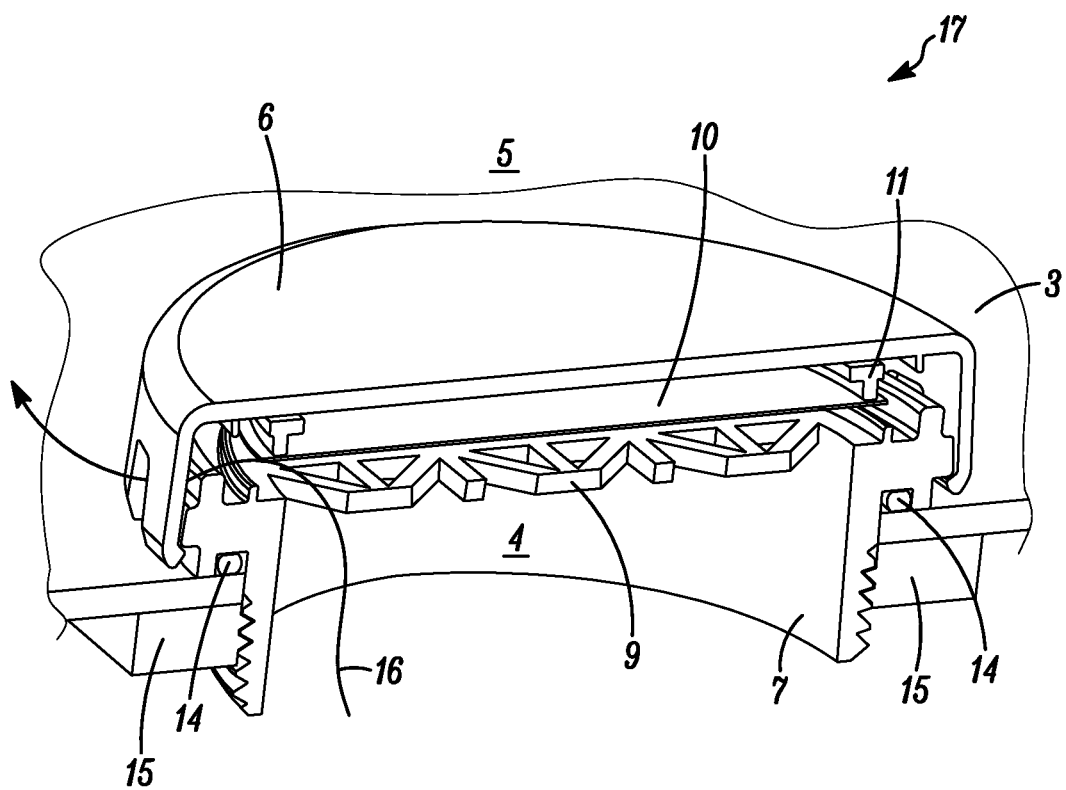
FIG. 6 shows a degassing valve according to another exemplary embodiment.

FIG. 6 shows another exemplary degassing valve 17 according to the disclosure. Different from the degassing valve 2 discussed above, in the degassing valve 17, the membrane 10 is integrally joined to the tensioning frame 11 and thus does not slide out from between the tensioning frame 11 and the support element 9. In the degassing valve 17, the membrane 10 can be, for example, welded to the tensioning frame 11. When the pressure difference between the interior 4 and the surroundings 5 of the housing 3 becomes so great that the trigger force is reached, the membrane 10 lifts off from the support element 9, as shown in FIG. 6, so that the fluid channel 16 between the interior 4 and the surroundings 5 of the housing is exposed. When the pressure difference drops so that the trigger force is no longer reached, the tensioning frame 11 again presses the membrane 10 against the support element 9. The trigger mechanism is therefore reversible, so that replacing the degassing valve 17 after triggering is not necessary to restore the original functionality of the degassing valve 17.

The explanations provided with reference to the figures are merely illustrative and shall not be understood to have any limiting effect. It is possible to make a large number of modifications to the described embodiments without departing from the scope of protection of the invention as defined in the accompanying claims.

LIST OF REFERENCE NUMERAL

1 Battery
2 Degassing valve according to an exemplary embodiment
3 Housing
4 Interior of the housing
5 Surroundings of the housing
6 Cover
7 Housing body
8 Detent elements
9 Support element
10 Membrane
11 Tensioning frame
12 Flexible springs
13 Hole
14 Sealing ring
15 Nut
16 Fluid channel
17 Degassing valve according to another exemplary embodiment

The invention claimed is:

1. A degassing valve for degassing a housing, the valve comprising:
   a support element configured to be coupled to the housing;
   a membrane, the membrane being water-proof and breathable; and
   a tensioning frame configured to press the membrane against the support element with a pressing force,
   wherein the membrane is clamped between the tensioning frame and the support element,
   the tensioning frame is configured such that when a pressure difference between an interior of the housing and a surrounding of the housing exceeds a trigger force, the membrane detaches from the support element and exposes a fluid channel between the interior of the housing and the surrounding of the housing, the exposed fluid channel being configured to degas the interior of the housing, and
   the membrane is configured to be clamped between the tensioning frame and the support element when the pressure difference is smaller than the trigger force, and to slide out from between the tensioning frame and the support element when the pressure difference is equal to or is larger than the trigger force.

2. The degassing valve according to claim 1, wherein the tensioning frame and the membrane are disposed in such a way that the tensioning frame presses the membrane in a direction toward the interior of the housing.

3. The degassing valve according to claim 1, wherein the tensioning frame includes at least one spring element configured to press the tensioning frame in a direction toward the support element.

4. The degassing valve according to claim 3, wherein the at least one spring element includes at least one leaf spring.

5. The degassing valve according to claim 3, further comprising:
   a cover pressing against and forming a stop for the at least one spring element, wherein the tensioning frame and the membrane are disposed between the cover and the support element.

6. The degassing valve according to claim 5, further comprising:
   a housing body, wherein:
   the support element is a part of the housing body, and
   the cover is connected to the housing body in a form-locked manner.

7. The degassing valve according to claim 6, wherein the cover and the housing body are engaged in a latching fashion.

8. The degassing valve according to claim 1, wherein the support element includes a grating.

9. The degassing valve according to claim 1, wherein the membrane is connected to the tensioning frame in at least one of an integral, a form-locked, or a force-fit manner.

10. The degassing valve according to claim 9, wherein the membrane is welded, bonded, or clamped to the tensioning frame.

11. The degassing valve according to claim 1, wherein the membrane has a circular shape and the tensioning frame has an annular shape.

12. The degassing valve according to claim 1, wherein the membrane is made of polytetrafluoroethylene.

13. The degassing valve according to claim 1, wherein the tensioning frame is designed in such a way that the trigger force is between 5 hPa and 50 hPa.

14. The degassing valve according to claim 13, wherein the tensioning frame is designed in such a way that the trigger force is between 15 hPa and 25 hPa.

15. A battery for a motor vehicle, comprising the degassing valve according to claim 1.

16. A housing for an energy storage cell, comprising:
   a valve for degassing gasses from an interior of the housing, wherein the valve further includes:
   a membrane formed of a water-proof material;
   a support element coupled to the housing and configured to support the membrane when a pressing force is applied; and
   a tensioning frame configured to press the membrane against the support element with the pressing force,
   wherein the membrane is clamped between the tensioning frame and the support element,
   the tensioning frame is configured such that when a pressure difference between an interior of the housing and a surrounding of the housing exceeds a trigger force, the membrane detaches from the support element and exposes a fluid channel between the interior of the housing and the surrounding of the housing, wherein the exposed fluid channel is configured to degas the interior of the housing, and
   the membrane is configured to be clamped between the tensioning frame and the support element when the pressure difference is smaller than the trigger force, and to slide out from between the tensioning frame and the support element when the pressure difference is equal to or is larger than the trigger force.

17. The housing according to claim 16, wherein the tensioning frame includes at least one spring element configured to press the tensioning frame in a direction toward the support element.

* * * * *